United States Patent [19]
Mates

[11] Patent Number: 5,815,724
[45] Date of Patent: Sep. 29, 1998

[54] METHOD AND APPARATUS FOR CONTROLLING POWER CONSUMPTION IN A MICROPROCESSOR

[75] Inventor: John William Benson Mates, Portland, Oreg.

[73] Assignee: Intel Corporation, Santa Clara, Calif.

[21] Appl. No.: 623,978

[22] Filed: Mar. 29, 1996

[51] Int. Cl.[6] ........................................... G96F 1/32
[52] U.S. Cl. .................. 395/750.04; 395/750.05; 395/560; 395/589; 395/590; 364/707
[58] Field of Search ..................... 395/750, 589, 395/590, 591, 595, 750.04, 750.05, 560; 364/707

[56] References Cited

U.S. PATENT DOCUMENTS

| | | | |
|---|---|---|---|
| 4,050,058 | 9/1977 | Garlic | 364/200 |
| 4,199,811 | 4/1980 | Borgerson et al. | 364/200 |
| 4,342,078 | 7/1982 | Tredennick et al. | 364/200 |
| 4,367,524 | 1/1983 | Budde et al. . | |
| 4,376,976 | 3/1983 | Lahti et al. | 364/200 |
| 4,387,427 | 6/1983 | Cox et al. . | |
| 4,875,160 | 10/1989 | Brown, III . | |
| 5,005,118 | 4/1991 | Lenoski | 364/200 |
| 5,101,344 | 3/1992 | Bonet et al. | 395/375 |
| 5,129,067 | 7/1992 | Johnson | 395/375 |
| 5,233,694 | 8/1993 | Hotta et al. | 395/375 |
| 5,235,686 | 8/1993 | Bosshart | 395/375 |
| 5,293,592 | 3/1994 | Fu et al. | 395/375 |
| 5,371,864 | 12/1994 | Chuang | 395/375 |
| 5,392,437 | 2/1995 | Matter et al. . | |
| 5,519,864 | 5/1996 | Martell et al. . | |
| 5,537,656 | 7/1996 | Mozdzen et al. . | |
| 5,586,278 | 12/1996 | Papworth et al. . | |
| 5,625,789 | 4/1997 | Hesson et al. . | |
| 5,627,983 | 5/1997 | Popescu et al. . | |

OTHER PUBLICATIONS

IEEE Micro, "The Metaflow Architecture", Val Popesu, Merle Schultz, John Spracklen, Gary Gibson, Bruce Lightner, and David Isaman, pp. 10–13 and 63–73, Jun. 1991.

*Primary Examiner*—Ayaz R. Sheikh
*Assistant Examiner*—Rupal D. Dharia
*Attorney, Agent, or Firm*—Blakely, Sokoloff, Taylor & Zafman

[57] ABSTRACT

A system for controlling power consumption in a microprocessor. The microprocessor fetches an instruction from memory. The instruction is decoded, producing an operation flow of at least one operation. Then, power micro-operations are introduced into the operation flow. These power micro-operations provide power consumption control functions for those functional units which are required to execute the various operations which have been decoded from the fetched instruction. The operations and power micro-operations are then scheduled for dispatch to the appropriate execution units. The scheduling is based on the availability of the appropriate execution units and the validity of operation data. The operations and power micro-operations are dispatched to the appropriate execution units, where the operations and power micro-operations are executed. The execution results are subsequently committed to the processor state in the original program order.

24 Claims, 4 Drawing Sheets

METHOD AND APPARATUS FOR CONTROLLING POWER CONSUMPTION IN A MICROPROCESSOR

BACKGROUND OF THE INVENTION

1. Field of the Invention

The present invention pertains to the field of integrated circuits. More particularly, this invention relates to reducing power consumption in a microprocessor.

2. Background of the Related Art

Advances in silicon process technology and microprocessor architecture have led to very complex microprocessors containing millions of transistors. As the complexity of these microprocessors increases, the power consumed by these devices increases as well. Increased power consumption results in increased operating costs and computer system over-heating problems, which lead to reliability problems. Also, the increased power consumption leads to shorter battery life in battery operated computers.

Methods for controlling power consumption include causing the clock signal coupled to the microprocessor to stop when the microprocessor is idle, or by reducing the frequency of the microprocessor clock. The problem with reducing the microprocessor clock frequency or stopping the microprocessor clock is that both methods negatively affect system performance. More particularly, software control is required to monitor system events, which increases system overhead. Also, reduced clock frequency leads directly to reduced microprocessor performance. Further, the system overhead requirements increase dramatically in multi-processor systems, as the operating system needs to track the activity of each microprocessor.

Another method for controlling power consumption in a microprocessor includes placing circuitry throughout the microprocessor that tracks events that occur within the microprocessor. The circuitry is designed to detect the occurrence of certain events within the microprocessor, and to take steps to perform power management functions, typically shutting down a clock signal feeding a particular functional unit within the microprocessor.

However, this approach has some drawbacks. The power management circuitry in prior microprocessors is spread throughout the microprocessor. There is no single control unit that takes care of all power management functions. Because the power management circuitry is spread throughout the microprocessor, power management circuit design becomes very difficult, and the circuitry becomes difficult to debug. In particular, microprocessors which perform out-of-order execution of operations cause power management circuit design and debug difficulties because the order of operation execution cannot be predetermined. Also, the power saving abilities of the power management circuitry are limited by the amount of intelligence designed into the circuitry. As more intelligence is designed into these circuits, the circuits become larger and require more die real estate, which increases manufacturing costs.

The previously discussed limitations of prior systems for controlling power consumption in microprocessors, including software overhead, reduced performance, and circuit design and debug difficulties, result in computer systems that suffer from reduced performance, inefficient power management, and increased cost.

SUMMARY OF THE INVENTION

The present invention provides a method and apparatus for controlling power consumption in a microprocessor. In the present invention, a microprocessor fetches an instruction from memory. The instruction is then decoded, and at least one operation is decoded from the instruction. Power micro-operations are introduced into the operation flow that provide control functions for those functional units which are required to execute the various operations which have been decoded from the fetched instruction. The operations and power micro-operations are scheduled for dispatch to the appropriate execution units. Once scheduled, the operations and power micro-operations are dispatched to the appropriate execution units, where the operations and power micro-operations are executed.

DETAILED DESCRIPTION

Methods and apparatus for controlling power consumption in a microprocessor are disclosed. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

For the purposes of illustration, the present invention is described in the context of an architecture and instructions compatible with the Intel® microprocessor architecture (Intel is a registered trademark of Intel Corporation). However, it is contemplated that the present invention may be practiced with other instruction sets and architectures as well, including reduced instruction set computers (RISC). In the following description, the exemplary instructions supplied to the decoder (termed "macroinstructions") have the well-known format of the Intel instruction set which is described, for example, in the i486™ *Programmers Reference Manual*, 1990, available from Intel Corporation, and the *Pentium*™ *Processor User's Manual*, Volume 3, 1994, also available from Intel Corporation.

Although the following embodiment is described using a floating point addition instruction and a floating point execution unit, the present invention may be practiced with other types of instructions and functional units as well. For example, the present invention may be practiced to enable a functional unit that accesses memory when an instruction is decoded that requires a memory access. In this manner, a microprocessor implemented in accordance with the present invention can efficiently control power consumption, since only the required functional units are enabled at a given time. Further, the present invention may be practiced to offer other types of power consumption control to the functional units other than turning the units on or off.

Further, although the following embodiment is described in the context of power management control, the present invention may be practiced to provide other forms of dynamic control to the microprocessor by way of dynamic control micro-operations. These dynamic control micro-operations perform additional control functions not necessarily dictated by the instructions. For example, the present invention may be practiced to dynamically change cache size or to adjust bus protocols depending on the instruction to be executed.

Figure 1:
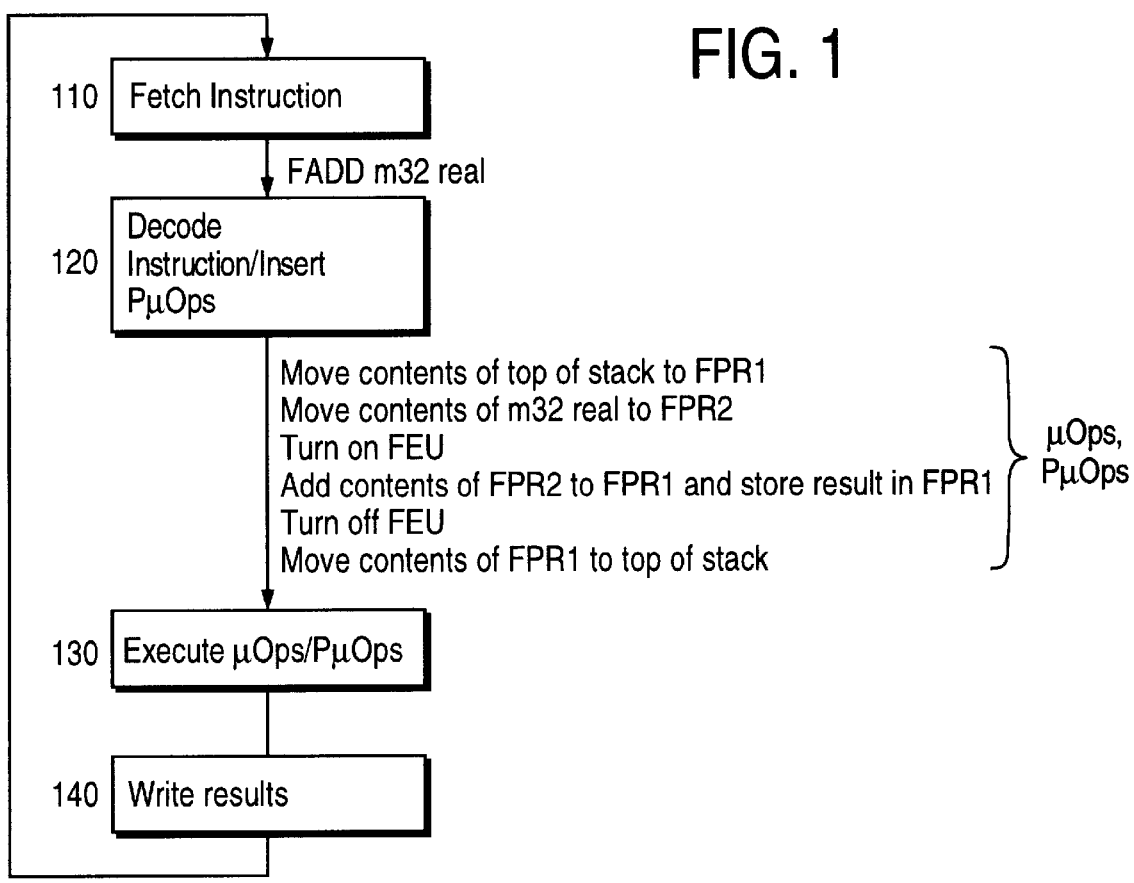
FIG. 1 depicts a method for fetching, decoding, executing, and writing results in one embodiment of a microprocessor implemented in accordance with the teachings of the present invention.

FIG. 1 depicts one embodiment of a method for fetching, decoding, executing, and writing results in accordance with the present invention. The method of FIG. 1 includes the insertion of power micro-operations, or PµOps, into the operation flow. The PµOps provide system-transparent power management control functions which enable and disable various functional units depending on the requirements of the operation flow. Referring again to FIG. 1, in the Fetch Instruction step 110, a macroinstruction is fetched from memory. In this example, the macroinstruction fetched is FADD m32 real, which adds a 32 bit floating point number stored in memory to a 32 bit floating point number stored on top of the stack, and stores the results on top of the stack. Once the macroinstruction is fetched from memory, it is decoded at the Decode Instruction/Insert PµOps step 120. At this step, the FADD m32 real macroinstruction is broken down into a number of micro-operations (µOps). In this example, the µOps specify that the contents of the stack be placed in a floating point register FPR1, that the contents of memory location m32 real be moved to another floating point register FPR2, that the contents of FPR1 and FPR2 be added, and that the results of the addition are stored on top of the stack. In addition, two PµOps are inserted into the operation flow. To determine which PµOps to insert, at the Decode Instruction/Insert PµOps step 120, the macroinstruction is examined to determine which functional units are required in order to execute the decoded macroinstruction. For example, the PµOps specify that the Floating Point Execution Unit (FEU) is turned on before the floating point addition occurs and turned off again after the floating point addition has completed.

One feature of the system and method of the present invention is that the method for controlling power consumption is transparent, meaning that no software or operating system support is required. The operating system is unaware of the PµOps, and the power consumption control activities provided by the PµOps occur independent of any operating system or other software program. Since the operating system need not monitor the power consumption control activities provided by the PµOps, the system software overhead is reduced, providing performance advantages over prior systems and methods.

Figure 2:
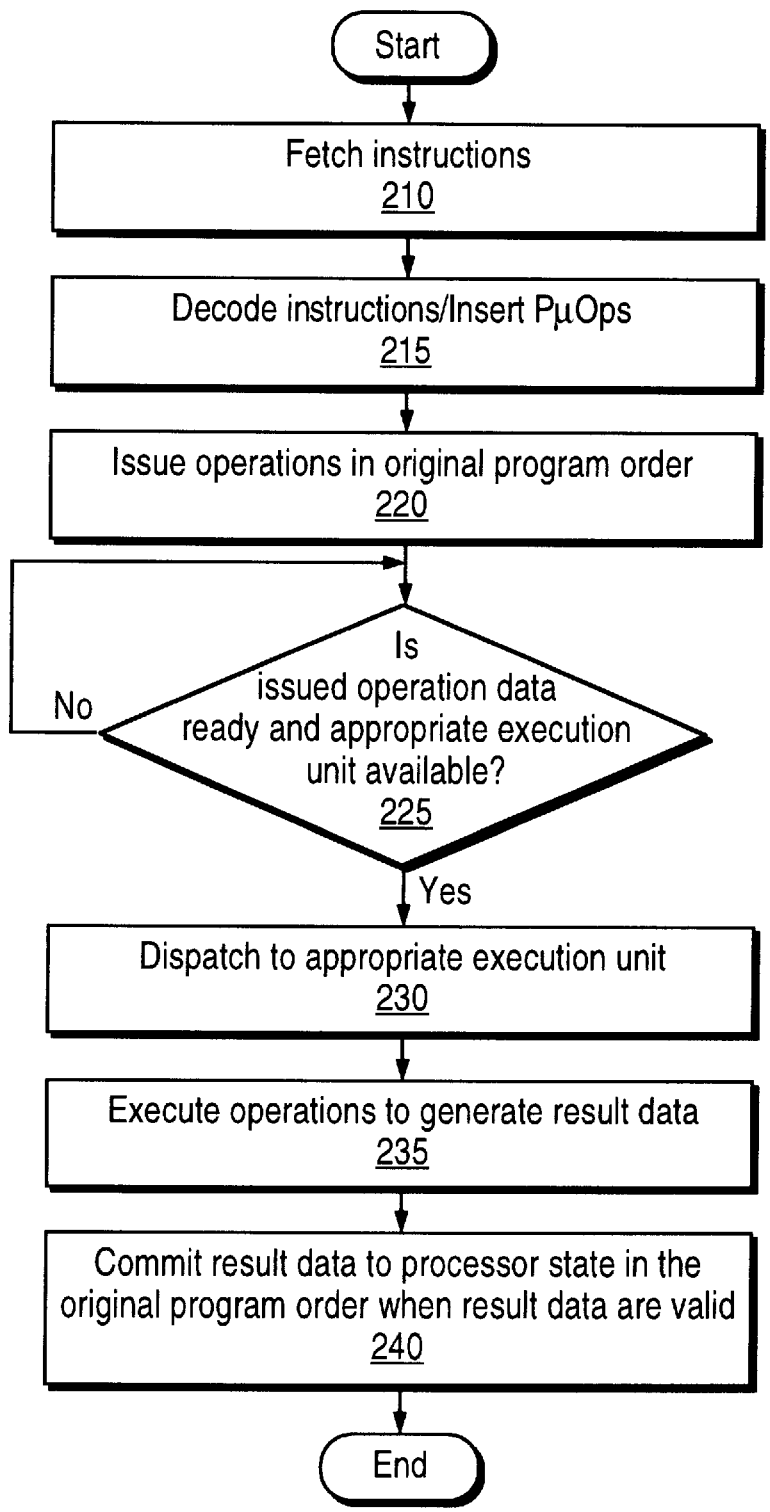
FIG. 2 is a flow diagram illustrating the operation of one embodiment of a microprocessor performing out-of-order dispatch and execution of operations configured in accordance with the teachings of the present invention.

The system and method of the present invention may be implemented in a microprocessor which performs out-of-order dispatch and execution of operations. FIG. 2 is a flow diagram illustrating the operation of one embodiment of a method for performing out-of-order dispatch and execution of operations. At step 210, instructions are fetched. After the instructions are fetched, the instructions are decoded at step 215 and the appropriate PµOps are inserted into operation flow. At step 220, the decoded operations and PµOps are issued in their original program order. At step 225, the operations are scheduled. The operations may be scheduled to be dispatched and executed out-of-order, depending on operation data dependencies and execution unit availability. The PµOps are scheduled in a way that ensures that the appropriate execution units are enabled when the corresponding operations are executed. At step 230, the operations and PµOps are dispatched to the appropriate execution units. The operations and PµOps are executed at step 235, and at step 240 the results of the executed operations are committed to the processor state in the original program order.

Figure 3:
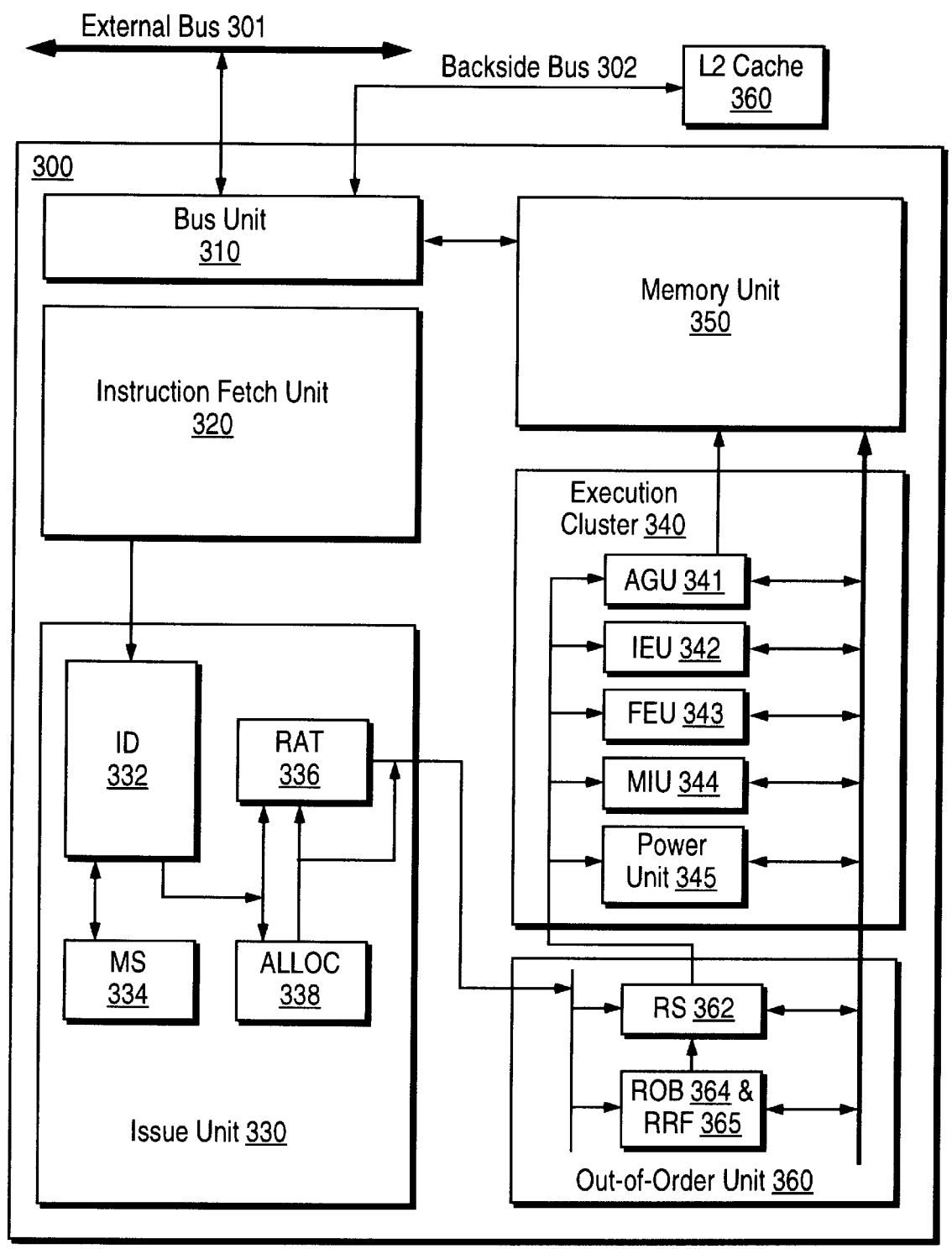
FIG. 3 is a block diagram of one embodiment of a microprocessor configured in accordance with the teachings of the present invention.

FIG. 3 shows a block diagram of one embodiment of a microprocessor implemented in accordance with the present invention. In the present embodiment, the Instruction Fetch Unit (IFU) 320 fetches macroinstructions. The macroinstructions may reside in main memory, which is accessed over the External Bus 301 via the Bus Unit 310, or may reside in the L2 Cache 360, which is accessed by way of the Backside Bus 302. Alternatively, the macroinstructions may reside in an instruction cache located within the microprocessor.

Once fetched, the macroinstructions are sent to the Issue Cluster 330, which includes an Instruction Decoder (ID) 332, a Micro-operation Sequencer (MS) 334, a Register Alias Table (RAT) 336, and an Allocator (ALLOC) 338. The ID 332 converts a stream of macroinstructions into µOps, and inserts appropriate PµOps into the operation flow.

For macroinstructions requiring long µOp flow for decoding, the MS 334 is used to sequence the macroinstructions. The RAT 336 performs register renaming by mapping logical registers to physical registers in the Re-Order Buffer (ROB) 364, and the ALLOC 338 assigns and tracks resources for operation for the Out-of-Order Unit 360 and the Memory Unit 350.

The Out-of-Order Unit 360 contains the Reservation Station (RS) 362 and ROB 364. The ROB 364 includes a Real Register File (RRF) 365 that defines the architectural register set for the microprocessor. The Out-of-Order Unit 360 receives µOps and PµOps from the Issue Cluster 330. The Out-of-Order Unit 360 merges the in-order stream of µOps and PµOps with corresponding source data provided by the ROB 364 and captured in the RS 362. The Out-of-Order Unit 360 also performs schedule, dispatch, and retirement functions. In order to perform the schedule function, the RS 362 identifies all ready-to-execute µOps and PµOps, and selects certain µOps and PµOps for dispatch to the Execution Cluster 340. The µOps and PµOps are executed in an execution unit in the Execution Cluster 340, and result data is written back to the Out-of-Order Unit 360. The ROB 364 retires the µOps and PµOps by transferring the result data to the RRF 365 in the original program order.

In order to perform the issue function implemented in the Issue Cluster 330, control information is written in ROB 364 entries and an associated ready bit is cleared. For each µOp and PµOp, an op code, source data, source/destination addresses, and other control information are written into the RS 362 entries. This control information may include information that binds one µOp or PµOp to another, thus forcing the bound pair to be executed serially. Source data for the execution units originates from either the ROB 364 or a real register contained in the RRF 365. Consequently, source data entries in the RS 362 contain a bit to identify whether the source data is stored in the ROB 364 or in the RRF 365. The valid bit in the ROB 364 indicates whether the corresponding source data entry is valid.

In order to schedule the µOps and PµOps for the execution units in the Execution Cluster 340, the RS 362 ascertains which µOps and PµOps are data ready by evaluating a corresponding data valid bit for each source data. The RS 362 then determines availability of execution units for data ready µOps and PµOps, and schedules the µOps and PµOps based on a priority pointer. The PμOps are scheduled in a way that ensures that the various functional units required to execute the other μOps stored in the RS 362 are enabled during the required periods of time. The RS 362 may also be implemented to look for situations where a particular functional unit is scheduled to be turned on and off repeatedly, for example where a series of floating point operations are scheduled to be executed in the Floating Point Execution Unit (FEU) 343. In such a case, the RS 362 would not schedule the PμOps to turn on and off the FEU for each floating point operation, but would rather schedule the PμOps so that the FEU 343 was turned on before executing the first floating point operation in the series and then turned off after the last floating point operation in the series was executed. Also, the PμOps are scheduled to be executed in parallel with other μOps or PμOps whenever possible, thus ensuring that any degradation in the otherwise available performance will be minimized. For the scheduled μOps and PμOps, the RS 362 dispatches the μOps and PμOps and associated source data to the appropriate execution unit.

Upon completion of execution of μOps and PμOps in the Execution Cluster 340, the execution units transmit pointer addresses to the ROB 364 prior to writing the actual result data. The pointer addresses identify ROB 364 entries that are the destinations for the result data. Subsequently, the execution unit writes result data to the specified ROB 364 entry. The RS 362 monitors the writing of result data to the ROB 364 in order to capture data required for other μOps.

In order to perform the retirement function, in which the result data is committed to the processor state, a number of consecutive entries are read out of the ROB 364 based on the physical destination identifiers. The entries read from the ROB 364 are candidates for retirement. A μOp or a PμOp is a candidate for retirement if a corresponding ready bit is set, the μOp or PμOp does not cause and exception, and all preceding μOp candidates, in the original program order, are eligible for retirement. When μOp or PμOp is eligible for retirement, the RAT 336 is notified to update its look-up table, which maintains logical and physical register mapping information, and data are transferred from the ROB 364 to the RRF 365. In addition, a retirement pointer is incremented in the ROB 364 to indicate that the ROB entry has retired.

In one embodiment, the Execution Cluster 340 contains five semi-autonomous units: an address generation unit (AGU) 341, and integer execution unit (IEU) 342, a floating point execution unit (FEU) 343, a memory interface unit (MIU) 344, and a Power Unit 345, which executes the PμOps. Although the Execution Cluster 340 is described in conjunction with five execution units, the Execution Cluster 340 may include any number and type of execution units without deviating from the spirit and scope of the present invention.

In one embodiment, the power unit 345 executes the PμOps by enabling or disabling clock signals that are coupled to other functional units throughout the microprocessor. These other functional units may include but are not limited to the FEU, IEU, MIU, and AGU. The power unit 345 may also be implemented to control clock signals which are coupled to registers, queues, caches, etc., thereby allowing the Power Unit to control power consumption in any unused or unneeded functional units. By disabling clock signals, the power consumed in the disabled functional units is dramatically reduced.

As shown in FIG. 3, the IFU 320 is coupled to the ID 332. In the present embodiment, the ID 332 provides multiple decoders so as to decode multiple macroinstructions simultaneously. At each clock cycle, the ID 332 receives macroinstructions from the IFU 320. In turn, the ID 332 translates the macroinstructions into μOps each clock cycle. Also, at each clock cycle appropriate PμOps are inserted into the operation flow. In addition, the ID 332 is coupled to the MS 334. The ID 332 requests microcode operation from the MS 334 for macroinstructions requiring the decoding of long microcode sequences, as is well known to those skilled in the art.

Figure 4:
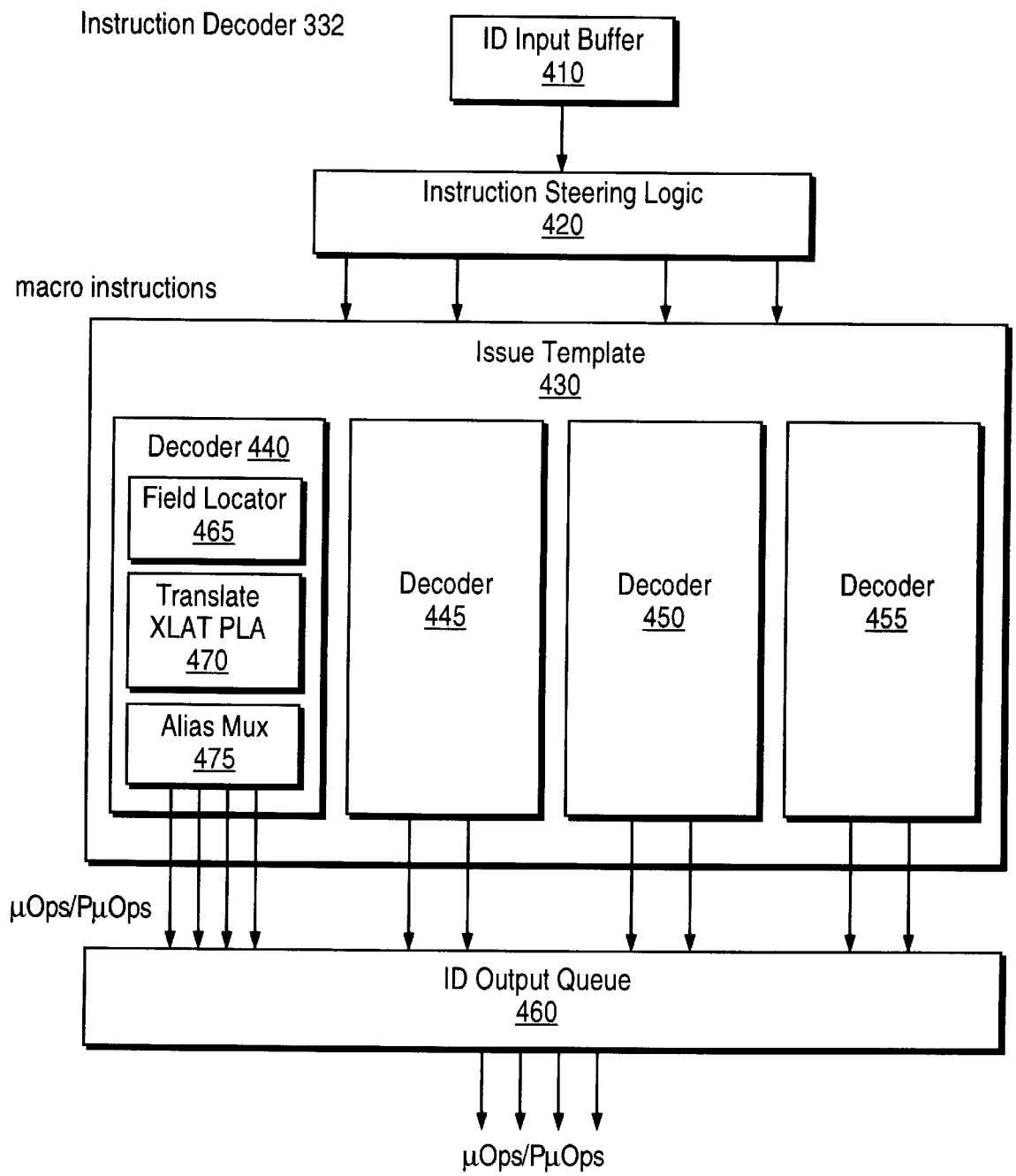
FIG. 4 is a block diagram of one embodiment of an instruction decoder configured in accordance with the teachings of the present invention.

FIG. 4 is a block diagram of the ID 332 configured in accordance with one embodiment of the present invention. As explained earlier, the ID 332 converts a stream of macroinstructions into μOps, and inserts PμOps into the operation flow. The ID 332 contains an ID Input Buffer 410. A number of macroinstructions are stored in the ID Input Buffer 410 to generate a queue of macroinstructions for decoding. This queue allows the ID Input Buffer 410 to provide a steady stream of macroinstructions to the Instruction Steering Logic 420, also included in the ID 332. The Instruction Steering Logic 420 directs each macroinstruction to a decoder located within the issue template 430.

The issue template 430 configuration permits parallel decoding of macroinstructions. The issue template 430 specifies the number of decoders and the capabilities of each decoder. For the embodiment illustrated in FIG. 4, the ID 332 contains four decoder blocks, 440, 445, 450, and 455. The decoders 440, 445, 450, and 455 are coupled to an ID Output Queue 460. In the present embodiment, certain decoders decode all types of instructions while other decoders decode only particular instructions. The issue template 430 is configured such that decoder 440 issues up to four μOps or PμOps, and decoders 445, 450, and 455 issue up to two μOps or PμOps per clock period. Consequently, up to ten μOps or PμOps per clock period may be generated in the issue template 430. Although ID 332 is described in conjunction with four decoder blocks, any number of decoder blocks may be implemented without deviating form the spirit and scope of the invention.

The operation of each decoder 440, 445, 450, and 455 is dependent upon the particular macroinstruction set utilized by the processor. In general, each decoder block extracts operand and opcode fields from the macroinstruction in a Field Locator 465, and stores data in alias registers (not shown). Each decoder also contains at least one Translate Programmable Logic Array (XLAT PLA) 470; preferably one PLA for each μOp or PμOp that the decoder is capable of producing. The XLAT PLA 470 operates in parallel with the Field Locator 465, and contains microcode for generating control μOps and PμOps. An Alias Multiplexor (Alias Mux) 475 merges, as is well known in the art, the control μOps with data extracted by the Field Locator 465 to generate the μOps.

Preferably, decoder 440 decodes instructions requiring longer microcode sequencing. Furthermore, macroinstructions having greater than four μOps or PμOps summons the MS 334 to sequence the ID 332 during long microcode routines. Once the MS 334 completes the sequencing of the long microcode routines, control is returned to the ID 332. The μOps and PμOps are issued in the original program order.

The ID Output Queue 460 decouples the decode pipeline from the Out-of-Order Unit 360 pipeline by buffering the decoded μOps and PμOps. The ID Output Queue 460 attempts to provide a steady flow of μOps and PμOps each clock cycle. The ID Output Queue 460 permits decoding of instructions even when the Out-of-Order Unit (360, FIG. 3) is stalled. The ID Output Queue 460 compensates for the variable number of μOps and PμOps produced per macro-instruction.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A method for controlling power consumption in a microprocessor, comprising the steps of:

fetching an instruction;

decoding the instruction to produce at least one operation, thereby creating an operation flow;

inserting at least one power micro-operation into the operation flow, the power micro-operation providing power consumption control for at least one functional unit required to execute the operation, the power micro-operation in addition to the operation provided by decoding the instruction;

scheduling the operation and power micro-operation for dispatch; and dispatching the operation and power micro-operation to appropriate execution units for execution.

2. The method for controlling power consumption in a microprocessor of claim 1, wherein the step of scheduling the operation and power micro-operation further includes scheduling the operation and power micro-operation according to availability of appropriate execution units and operation data.

3. The method for controlling power consumption in a microprocessor of claim 2, further comprising the steps of:

executing the operation and power micro-operation to generate result data; and committing result data to the processor state in the original program order when the result data are valid.

4. The method for controlling power consumption in a microprocessor of claim 3, wherein the step of scheduling the operation and power micro-operation for dispatch further includes scheduling the power micro-operation such that the appropriate functional units are enabled before the corresponding operation is executed and are disabled after the corresponding operation has been executed.

5. The method for controlling power consumption in a microprocessor of claim 4, wherein the step of dispatching the operation and power micro-operation includes dispatching the power micro-operation to a power unit for execution.

6. The method for controlling power consumption in a microprocessor of claim 5, wherein the power unit executes the power micro-operation through manipulation of a plurality of clock signals coupled to the functional units.

7. A microprocessor, comprising:

means for fetching an instruction;

means for decoding the instruction to produce at least one operation, thereby creating an operation flow;

means for inserting at least one power micro-operation into the operation flow, the power micro-operation providing power consumption control for at least one functional unit required to execute the instruction, the power micro-operation in addition to the operation provided by decoding the instruction;

means for scheduling the operation and power micro-operation for dispatch; and means for dispatching the operation and power micro-operation to appropriate execution units for execution.

8. The microprocessor of claim 7, wherein the means for scheduling the operation and power micro-operation for dispatch further includes means for scheduling the operation and power micro-operation for dispatch according to availability of appropriate execution units and operation data.

9. The microprocessor of claim 8, further comprising:

means for executing the operations to generate result data;

means for executing the power micro-operations; and means for committing result data to the processor state in the original program order when result data are valid.

10. The microprocessor of claim 9, wherein the means for scheduling the operation and power micro-operation for dispatch schedules the power micro-operation such that the appropriate functional units are enabled before the corresponding operation is executed and are disabled after the corresponding operation has been executed.

11. The microprocessor of claim 10, wherein the means for executing the power micro-operation executes the power micro-operation through manipulation of a plurality of clock signals coupled to the functional units.

12. A microprocessor, comprising:

an instruction decoder receiving at least one instruction, the instruction decoder producing at least one operation for each instruction, said instruction decoder further producing at least one power micro-operation providing power consumption control for at least one functional unit required to execute the operation, the power micro-operation in addition to the operation provided by decoding the instruction; and at least one execution unit, the execution unit generating result data through execution of the operation and the power micro-operation.

13. The microprocessor of claim 12, further comprising:

an out-of-order unit, the out-of-order unit scheduling the operation and power micro-operation for dispatch according to availability of appropriate execution units and operation data and the out-of-order unit committing result data to the processor state in the original program order when result data are valid after the operation and power micro-operation have been executed.

14. The microprocessor of claim 13 wherein the out-of-order unit schedules the power micro-operation such that the appropriate functional units are enabled before the corresponding operation is executed and are disabled after the corresponding operation has been executed.

15. The microprocessor of claim 14, further comprising a power unit, the power unit executing the power micro-operation.

16. The microprocessor of claim 15, wherein the power unit executes the power micro-operation through manipulation of a plurality of clock signals coupled to the functional units.

17. A method for dynamically controlling functions in a microprocessor, comprising the steps of:

fetching an instruction;

decoding the instruction to produce at least one operation, thereby creating an operation flow;

inserting at least one dynamic control micro-operation into the operation flow, the dynamic control micro-operation providing additional control for at least one functional unit required to execute the operation, the dynamic control micro-operation in addition to the operation provided by decoding the instruction;

scheduling the operation and dynamic control micro-operation for dispatch; and dispatching the operation and dynamic control micro-operation to appropriate execution units for execution.

18. The method for dynamically controlling functions in a microprocessor of claim 17, wherein the dynamic control micro-operation provides control to change cache size.

19. The method for dynamically controlling functions in a microprocessor of claim 17, wherein the dynamic control micro-operation provides control to change bus protocol.

20. The method for dynamically controlling functions in a microprocessor of claim 17, wherein the dynamic control micro-operation provides power consumption control.

21. A microprocessor, comprising:

an instruction decoder receiving at least one instruction, the instruction decoder producing at least one operation for each instruction, said instruction decoder further producing at least one dynamic control micro-operation providing additional control for at least one functional unit required to execute the operation, the dynamic control micro-operation in addition to the operation provided by decoding the instruction; and at least one execution unit, the execution unit generating result data through execution of the operation and the dynamic control micro-operation.

22. The microprocessor of claim 21 wherein the dynamic control micro-operation provides control to change cache size.

23. The microprocessor of claim 21 wherein the dynamic control micro-operation provides control to change bus protocol.

24. The microprocessor of claim 21 wherein the dynamic control micro-operation provides power consumption control.

* * * * *